(12) United States Patent
Zimmermann et al.

(10) Patent No.: US 11,876,265 B2
(45) Date of Patent: Jan. 16, 2024

(54) FUEL CELL AND FUEL CELL SYSTEM FOR AN AIRCRAFT

(71) Applicant: Airbus Defence and Space GmbH, Taufkirchen (DE)

(72) Inventors: Kristian Zimmermann, Taufkirchen (DE); Stephan Friedl, Taufkirchen (DE); Christian Metzner, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 92 days.

(21) Appl. No.: 17/462,297

(22) Filed: Aug. 31, 2021

(65) Prior Publication Data

US 2022/0085399 A1  Mar. 17, 2022

(30) Foreign Application Priority Data

Sep. 16, 2020 (DE) ..................... 10 2020 124 145.3

(51) Int. Cl.

| | |
|---|---|
| *H01M 8/10* | (2016.01) |
| *H01M 8/0258* | (2016.01) |
| *H01M 8/0202* | (2016.01) |
| *H01M 8/122* | (2016.01) |
| *H01M 8/1006* | (2016.01) |

(52) U.S. Cl.
CPC ........... *H01M 8/10* (2013.01); *H01M 8/0258* (2013.01); *H01M 8/0269* (2013.01); *H01M 8/1006* (2013.01); *H01M 8/122* (2013.01); *H01M 2250/20* (2013.01)

(58) Field of Classification Search
CPC .... H01M 8/10; H01M 8/0258; H01M 8/0269; H01M 8/1006; H01M 8/122; H01M 2250/20
USPC .......................................... 429/465
See application file for complete search history.

(56) References Cited

U.S. PATENT DOCUMENTS

| | | |
|---|---|---|
| 2004/0151975 A1 | 8/2004 | Allen |
| 2006/0234109 A1 | 10/2006 | Datta et al. |
| 2007/0224489 A1 | 9/2007 | Imura |
| 2008/0070082 A1 | 3/2008 | Norimatsu et al. |
| 2014/0325991 A1 | 11/2014 | Liew et al. |
| 2017/0341019 A1* | 11/2017 | Rheaume ................. A62C 3/08 |

(Continued)

FOREIGN PATENT DOCUMENTS

| | | |
|---|---|---|
| CN | 111 224 143 A | 6/2020 |
| DE | 11 2006 000 121 B4 | 2/2013 |

(Continued)

OTHER PUBLICATIONS

Non-Final Office Action for U.S. Appl. No. 17/388,177 dated Aug. 8, 2022.

(Continued)

*Primary Examiner* — James M Erwin (74) *Attorney, Agent, or Firm* — KDW FIRM PLLC (57) ABSTRACT

In order to improve usability of hybrid or fully electric aircraft, a fuel cell having improved efficiency and increased volume/weight specific energy density is provided. The fuel cell has a self-supporting membrane structure that is formed as a triply periodic level surface, which separates a first cavity supplied with gaseous fuel from a second cavity supplied with gaseous oxidizer in a gas-sealed manner while connecting the cavities in an ion-conductive manner.

18 Claims, 6 Drawing Sheets

(56) References Cited

U.S. PATENT DOCUMENTS

| | | |
|---|---|---|
| 2018/0351191 A1 | 12/2018 | Kang et al. |
| 2022/0037678 A1 | 2/2022 | Zimmerman et al. |
| 2022/0037685 A1 | 2/2022 | Zimmerman et al. |

FOREIGN PATENT DOCUMENTS

| | | |
|---|---|---|
| EP | 2 654 115 A1 | 10/2013 |
| EP | 3 754 768 A1 | 12/2020 |
| JP | 2002 151106 A | 5/2002 |
| JP | 2006 100091 A | 4/2006 |
| JP | 2008 159344 A | 7/2008 |
| WO | WO 98/35398 A1 | 8/1998 |
| WO | WO 2004/059771 A2 | 7/2004 |
| WO | WO 2019/074538 A1 | 4/2019 |

OTHER PUBLICATIONS

German Search Report for Application No. 102020124145.3 dated Jun. 17, 2021.
European Search Report for Application No. 21182358 dated Dec. 9, 2021.
European Search Report for Application No. 21182359 dated Dec. 10, 2021.
European Search Report for Application No. 21182360 dated Dec. 13, 2021.
German Search Report for Application No. 102020120033.1 dated May 4, 2021.
German Search Report for Application No. 102020120035.8 dated May 10, 2021.

* cited by examiner

FUEL CELL AND FUEL CELL SYSTEM FOR AN AIRCRAFT

CROSS-REFERENCE TO RELATED APPLICATION

This application claims priority to German Patent Application No. 10 2020 124 145.3 filed Sep. 16, 2020, the entire disclosure of which is incorporated by reference herein.

TECHNICAL FIELD

The disclosure herein concerns a fuel cell. The disclosure herein furthermore concerns a fuel cell system for an aircraft, and an aircraft.

BACKGROUND

Energy storage systems with high energy density are regarded as preparing the way for electric aircraft. Alternative drive concepts and energy sources are becoming increasingly important not only in individual transport but also in aviation. One concept is electric drives, or generally the generation of electrical energy in an aircraft. Hybrid electric and fully electric aircraft, like other systems and devices (motor vehicles, industry and leisure) sometimes require energy accumulators with low weight or volume. With respect to aviation, a high power density, ease of maintenance and high scalability are important. One candidate for providing the necessary energies are fuel cells, in particular solid oxide fuel cells.

At present, in particular batteries and hydrogen-based systems are used. Solid oxide fuel cells (SOFC) are a type of high-temperature fuel cell which converts a fuel (e.g. hydrogen) and an oxidation agent (e.g. air) into electricity, heat and other by-products such as e.g. water.

SOFC generally contain an electrolyte, an anode and a cathode, and connectors known as interconnectors. The interconnectors allow better discharge of the generated electrical current, since at normal operating temperature, the conductivity of the anode and cathode may be too low for efficient discharge of the current. Modern architectures are based on flat or tubular cells because of the ease of manufacture and the comparatively favorable ratio of active area to volume (also known as A/V).

SUMMARY

It is an object of the disclosure herein to improve fuel cells for use in aviation.

The object is achieved by the subject matter disclosed herein.

The disclosure herein creates a fuel cell, preferably a solid oxide fuel cell, for a fuel cell system preferably of an aircraft, wherein the fuel cell comprises a self-supporting membrane structure, wherein the membrane structure ion-conductively connects together a first open-pored cavity and a second open-pored cavity and separates them from one another gas-tightly, wherein the first cavity and the second cavity are mutually penetrating.

It is preferred that each cavity is configured to receive at least one elongate straight interconnector body.

It is preferred that each cavity contains at least one gas channel which is configured to be elongate and straight such that the interconnector body can be received therein.

It is preferred that a membrane structure region in each case connects together two adjacent gas channels ion-conductively and separates them from one another gas-tightly.

It is preferred that a first straight gas channel contained in the first cavity and a second straight gas channel contained in the second cavity are arranged skewed relative to one another.

It is preferred that the membrane structure contains a solid electrolyte.

It is preferred that an electrically conductive anode layer and an electrically conductive cathode layer are arranged on the membrane structure, wherein the anode layer is arranged in the one of the cavities and the cathode layer is arranged in the other of the cavities.

Preferably, the fuel cell comprises a plurality of elongate interconnector elements which are designed to be inserted in each of the cavities and to contact the membrane structure and/or the anode/cathode layer.

It is preferred that the interconnector element comprises an interconnector body with cylindrical outer periphery. It is preferred that the interconnector body is configured as a solid round bar or tube.

It is preferred that at least one of the interconnector elements is configured so as to form a linear contact, preferably a helical linear contact, with the membrane structure and/or the anode/cathode layer when the interconnector element is inserted in one of the cavities.

It is preferred that the interconnector element is configured to define, with the membrane structure and/or the anode/cathode layer, a gas passage region which allows a gas flow in the longitudinal direction and/or in the circumferential direction and/or a helical gas flow along the interconnector element when the interconnector element is inserted in one of the cavities.

Preferably, the fuel cell comprises at least one gas distributor which is arranged on an inlet side and/or an outlet side of the membrane structure, wherein the gas distributor, which is preferably arranged on the inlet side, is configured such that one of the cavities can be loaded with gaseous fuel and the other of the cavities can be loaded with gaseous oxidation agent, and/or wherein the gas distributor, which is preferably arranged on the outlet side, is configured such that the reaction products and/or residual gas can be discharged from the respective cavity.

It is preferred that the membrane structure is designed in the form of a triply periodic level surface.

It is preferred that the surface shape of the membrane structure is selected from a group of surface shapes comprising a gyroid shape, a gyroid-like shape, a diamond shape, a diamond-like shape, an iWP shape, an iWP-like shape, a solid P-shape, and a solid P-like shape.

The solid P-like surface shape obeys the equation:

$$\cos kx \cos ly \cos mz = 0.$$

The diamond-like surface shape obeys the equation:

$$\sin kx \sin ly \sin mz + \sin kx \cos ly \cos mz + \cos kx \sin ly \cos mz + \cos kx \cos ly \sin mz = 0.$$

The gyroid-like surface shape obeys the equation:

$$\cos kx \sin ly + \cos ly \sin mz + \sin kx \cos mz = 0.$$

The iWP-like surface shape obeys the equation:

$$\cos kx \cos ly + \cos ly \cos mz + \cos kx \cos mz - \cos kx \cos ly \cos mz = 0.$$

Here:

$$k = \frac{2\pi n}{L}, l = \frac{2\pi p}{L}, m = \frac{2\pi q}{L}$$

with L being the length of the unit cell and n, p, q∈ℕ.
Preferably, $$k = l = m = \frac{2\pi n}{L}$$

with L being the length of the unit cell and n∈ℕ.

In this case, the surface shapes are designated a gyroid shape, a diamond shape, an iWP shape and a solid P-shape.

The disclosure herein also includes surface shapes which deviate from the above-mentioned surface shapes by less than 10%. The deviation amount is preferably the mean quadratic deviation or standard deviation from the ideal shape defined by the equations.

The disclosure herein creates a fuel cell system for an aircraft comprising a plurality of fuel cells, wherein the fuel cells are electrically connected together in series and/or parallel.

The disclosure herein creates an aircraft comprising a preferred fuel cell and/or a preferred fuel cell system.

The disclosure herein concerns the use of a triply periodic minimal area as a membrane structure of a fuel cell, wherein the membrane structure ion-conductively connects together a volume which can be loaded with fuel and a volume which can be loaded with oxidation agent and separates them from one another gas-tightly.

Three-dimensionally shaped level surfaces can improve the A/V ratio and hence increase the energy density of the system. Also, modern production techniques such as additive manufacturing or 3-D printing may be used.

One idea is to create a volume with two cavities by a separator membrane of minimal wall thickness. The separator has a three-dimensionally curved, self-supporting geometry (constant and tangential). Because of the complexity of the design, 3-D printing is considered as a starting basis for its production.

In the present case, the electrolyte can be produced using 3-D printing. The anode and cathode may be applied for example by coating of the printed electrolyte. A manufacturing routine is also conceivable using 3-D printing of the anode, cathode and support structure, and subsequent coating of the further layers. Also, indirect manufacturing via single-use tools or single-use molds is conceivable. The casting models or tools may be 3-D printed.

Advantageously, the small membrane thickness can reduce the electrical losses. Also, the pressure difference between the cavities may be distributed more favorably via the curved membrane surface. The geometry also allows simple access to electrical contacts without blocking the gas flow.

A further idea is to use 2-volumetric, triply periodic level surfaces (TPLS) as the basic structure for the electrolytes of the SOFC, for example yttria-stabilized zirconia (YSZ). Examples of TPLS include gyroid, diamond, iWP, primitive, etc.

Electrical contacts may be achieved using rods/bars or wires which are introduced through the orthogonally or diagonally straight-running cavities of the TPLS.

It may improve the efficiency if the electrolyte or the membrane can be formed with a small wall thickness of less than 100 µm. This is possible for example using a slip-based debinding or sintering process in the 3-D printing, because of the comparatively high stiffness of the green body (unsintered state—particles can be bonded by polymer binders) of the self-supporting surfaces.

TPLS have the inherent property of being able to separate the gas stream.

TPLS may have a particularly high volume-specific functional area, so that the volume/weight-specific energy density can be increased.

The connecting bars or tubes (stiff, hollow and/or porous) may be inserted in the straight regions of the cavities. In a gyroid, a particularly advantageous helical linear contact can be formed between the bar and the gyroid surface.

The electrical contacts may penetrate the volume. The connectors may be fixed and sealed relative to the electrolyte geometry by shrinkage of the green body during sintering (YSZ with approximately 10% to 20% volume shrinkage leads to a tight fit).

The service life of SOFC may be extended because of isotropic thermal stresses combined with the structural mechanical properties of the TPLS. Furthermore, the strains between interconnectors or connectors and electrolyte or membrane structure can be reduced.

As in conventional fuel cells, hydrogen and oxygen are introduced into the two cavities which are separated by the thin membrane structure. The chemical reaction occurring across the thickness of the membrane generates an electrical current.

In contrast to conventional surface membranes, which usually require an additional mechanical stabilization, membranes with TPLS surface are self-stabilizing. This means that in TPLS, pressure differences no longer lead to major deformations which substantially reduce the efficiency of the SOFC. The entire system is self-supporting.

TPLS are difficult or impossible to produce using conventional machine tools. It is therefore proposed that the high-temperature-resistant ceramics be formed into a membrane structure by 3-D printing.

For a gyroid-based SOFC, a typical manufacturing process may be as follows.

The functional SOFC part is designed. The unit cell length and wall thickness may be minimized in order to increase the volume-specific functional area. Thus for a unit cell length of 2 mm and a wall thickness of 100 µm, approximately 3200 $m^2$ functional area per $m^3$ volume are possible.

3D-printing of the TPLS-based membrane structure or electrolyte by lithography-slip-based material with 3 mol-% to 8 mol-% YSZ and subsequent debinding/sintering to produce the ceramic state.

Production of the anode and cathode layers by a coating process (e.g. slip-based or other methods).

Insertion of interconnectors in bar or tube form into some or all straight-running cavities or gas channels, depending on SOFC power and interconnector resistance.

Sealing of the outside of the interconnector element by glass solder.

Arrangement of a gas distributor on the top side or underside of the fuel cell in order to be able to generate a vertical gas stream in the respective cavity in the vertical direction.

BRIEF DESCRIPTION OF THE DRAWINGS

Example embodiments are explained in more detail below with reference to the appended schematic drawings. The drawings show.

DETAILED DESCRIPTION

Figure 1:
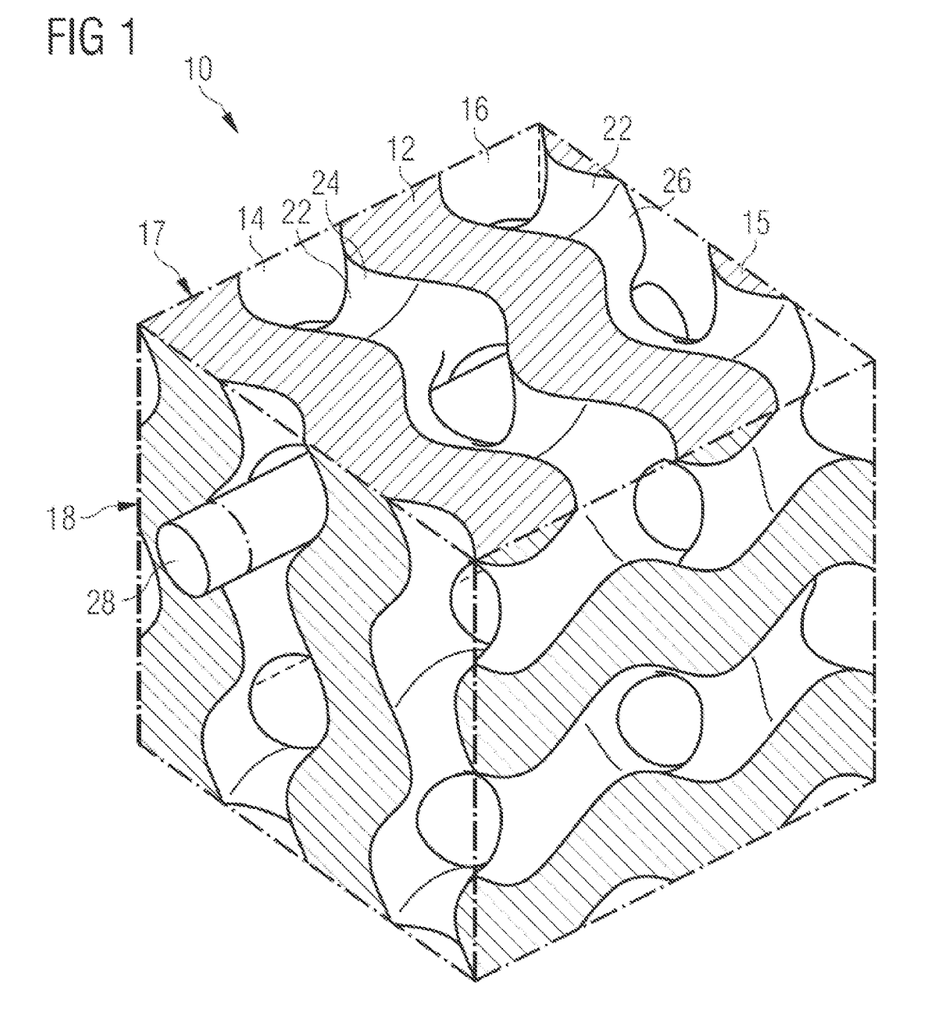
FIG. 1 an example embodiment of a fuel cell.
Figure 2:
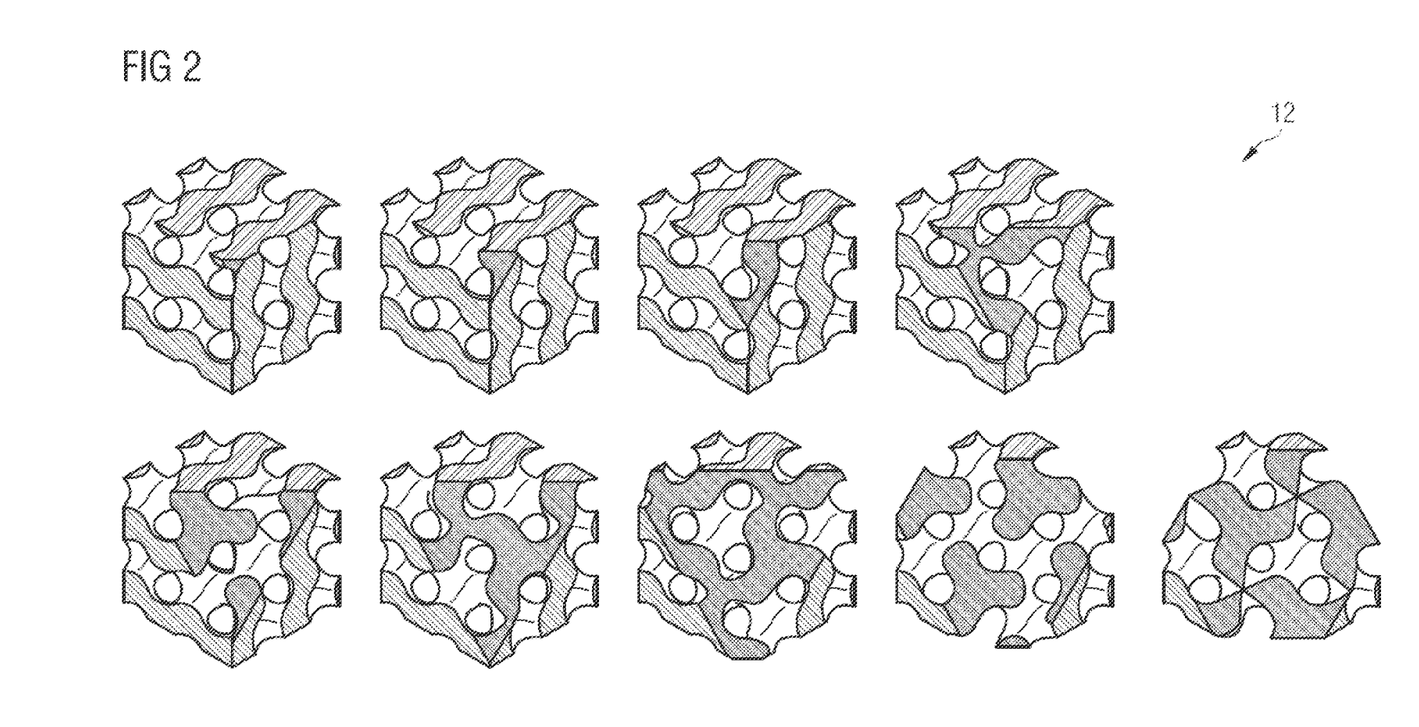
FIG. 2 a series of diagonal sections of a membrane structure.
Figure 3:
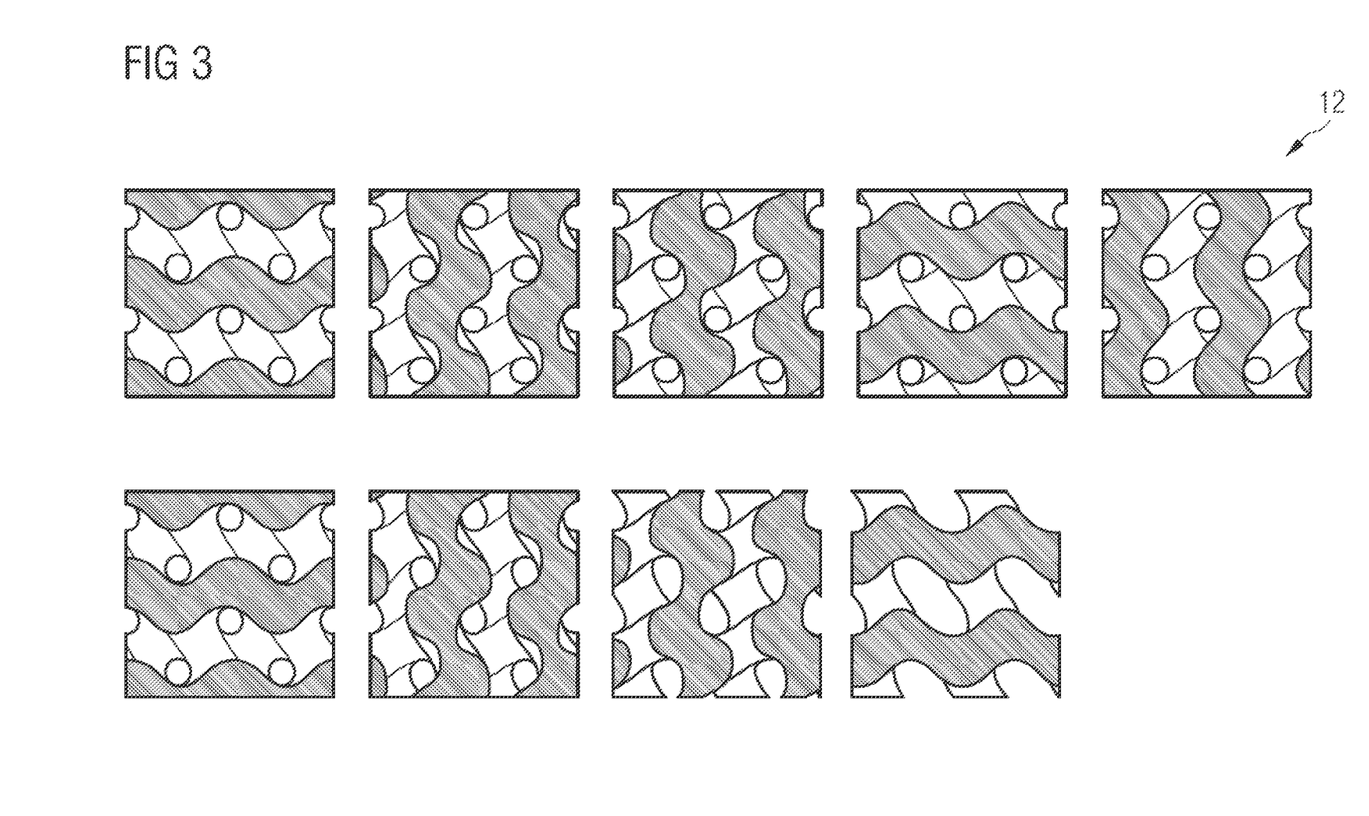
FIG. 3 a series of orthogonal sections of the membrane structure from FIG. 2.

Reference is firstly made to FIGS. 1 through 3, which show an example embodiment of the fuel cell 10. The fuel cell 10 is configured as a solid oxide fuel cell. The fuel cell 10 is configured such that it can be used in a fuel cell system of an aircraft.

The fuel cell 10 comprises a self-supporting membrane structure 12. The membrane structure 12 creates a first open-pored cavity 14 and a second open-pored cavity 16. The membrane structure 12 separates the first cavity 14 and the second cavity 16 from one another gas-tightly. The membrane structure 12 connects the first cavity 14 and the second cavity 16 together ion-conductively.

The membrane structure 12 preferably comprises a solid electrolyte 15 which allows the ion conduction.

The membrane structure 12 is configured such that the first cavity 14 and the second cavity 16 are mutually penetrating.

The membrane structure 12 forms a triply periodic level surface, for example a gyroid 17. Other such surfaces are conceivable.

Each cavity 14, 16 contains at least one gas channel 18. The gas channel 18 is configured as an elongate, substantially straight region so that a corresponding elongate, straight body may be inserted therein.

Adjacent gas channels 18 are separated from one another gas-tightly, but connected together ion-conductively, by a membrane structure region 20 of the membrane structure 12.

The membrane structure 12 has an electrically conductive contact layer 22. Depending on the arrangement of the contact layer 22, the contact layer 22 in the one cavity, for example the first cavity 14, is known as the anode layer 24, and the contact layer 22 in the other cavity, for example the second cavity 16, is known as the cathode layer 26.

The contact layer 22 serves to conduct the electrical energy generated in the fuel cell 10 to an electrical consumer, for example an electrically driven engine of the aircraft.

The fuel cell 10 furthermore comprises a plurality of interconnector elements 28 which are inserted in one of the gas channels 18. The interconnector element 28 is configured for example as a round bar or tube.

Figure 4A:
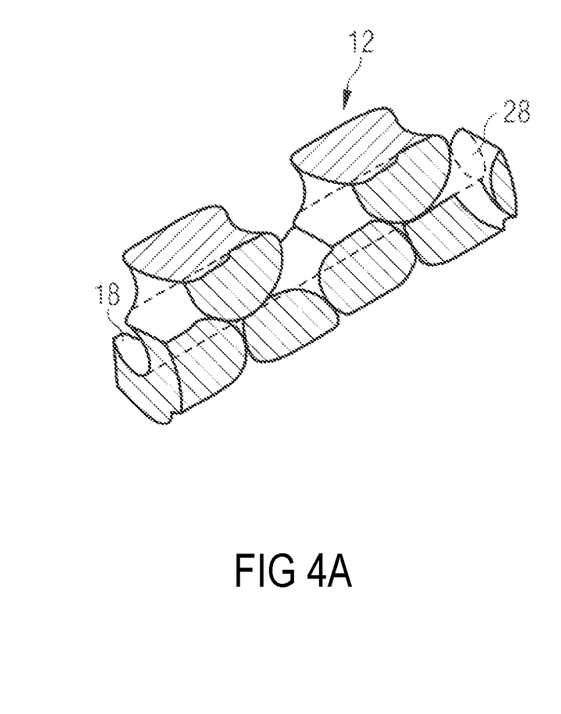
FIG. 4A a view of an inserted interconnector element.
Figure 4B:
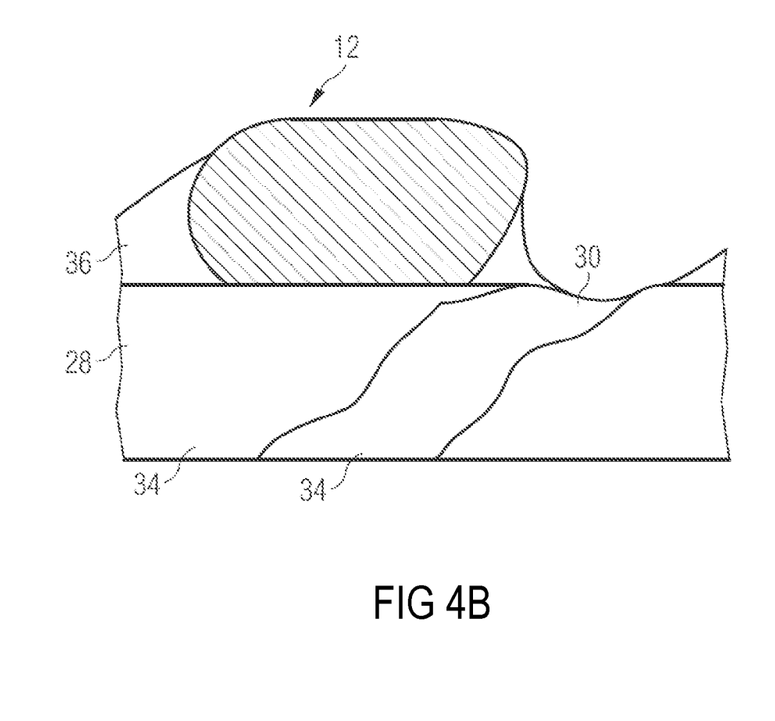
FIG. 4B a detail view of the contact region of the interconnector element with the membrane structure.
Figure 5:
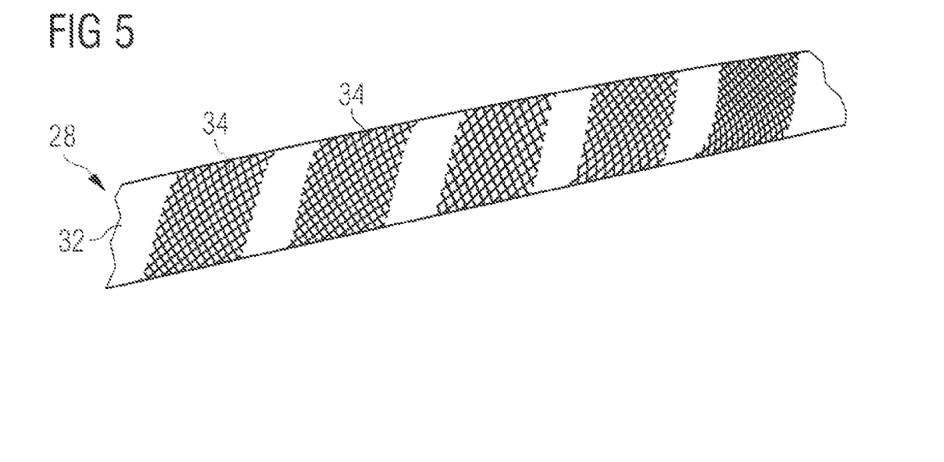
FIG. 5 an example embodiment of an interconnector element.

Reference is made below in particular to FIGS. 4A, 4B and FIG. 5. The interconnector element 28 preferably forms a linear contact 30 with the membrane structure 12. The linear contact 30 is helical in form. In other words, the linear contact 30 winds helically around the interconnector element 28 in its longitudinal direction.

The interconnector element 28 may have an interconnector body 32 which may be formed from an electrically conductive or isolating material. The interconnector element 28 may furthermore comprise a conductive strip 34 which is wound helically around the interconnector body 32 (FIG. 5).

The interconnector element 28 preferably defines, with the membrane structure 12, a gas passage region 36 which allows a gas flow along the outside of the interconnector elements 28. Alternatively or additionally, the gas stream may flow through the tubular interconnector element 28.

Figure 6:
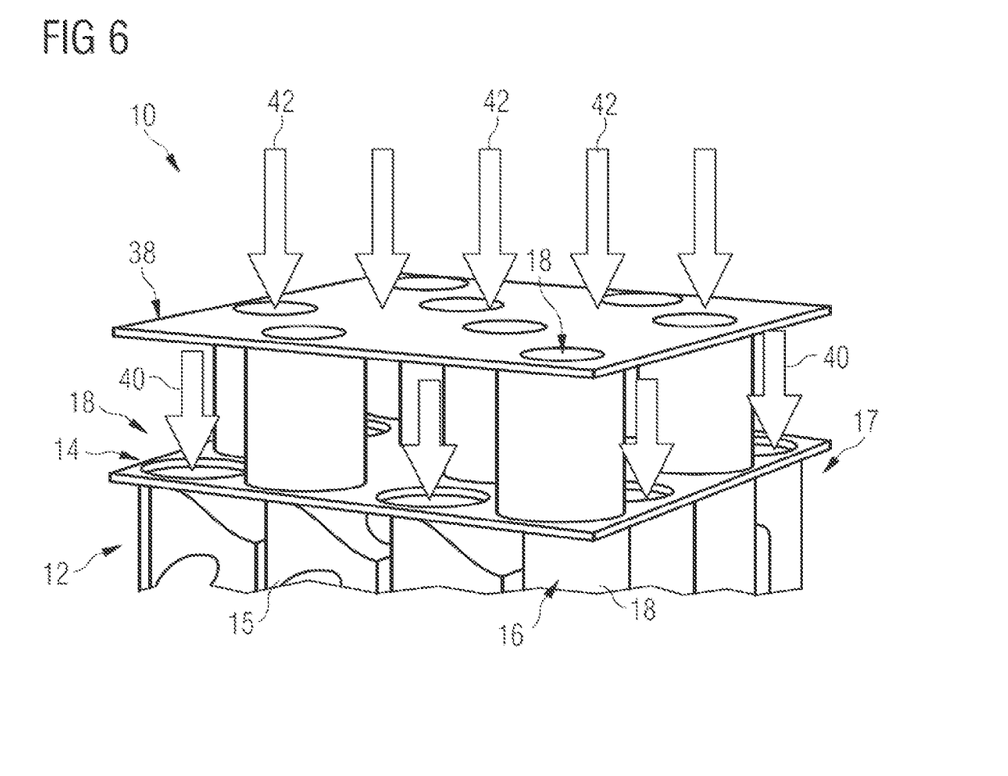
FIG. 6 an example embodiment of a gas distributor.

Reference is now made to FIG. 6. The fuel cell 10 may have a gas distributor 38. The gas distributor 38 is arranged for example on the inlet side 40 of the membrane structure 12. Further gas distributors, in particular on the outlet side of the membrane structure 12, may also be provided.

The gas distributor 38 is configured such that the fuel 40, for example hydrogen, can be conducted into the first cavity 14 while the oxidation agent 42, for example air, can be conducted into the second cavity 16.

The outlet-side gas distributor (not shown in detail) allows the discharge of the reaction products and residual gas. The outlet-side gas distributor is preferably configured identically to the inlet-side gas distributor 38.

Figure 7:
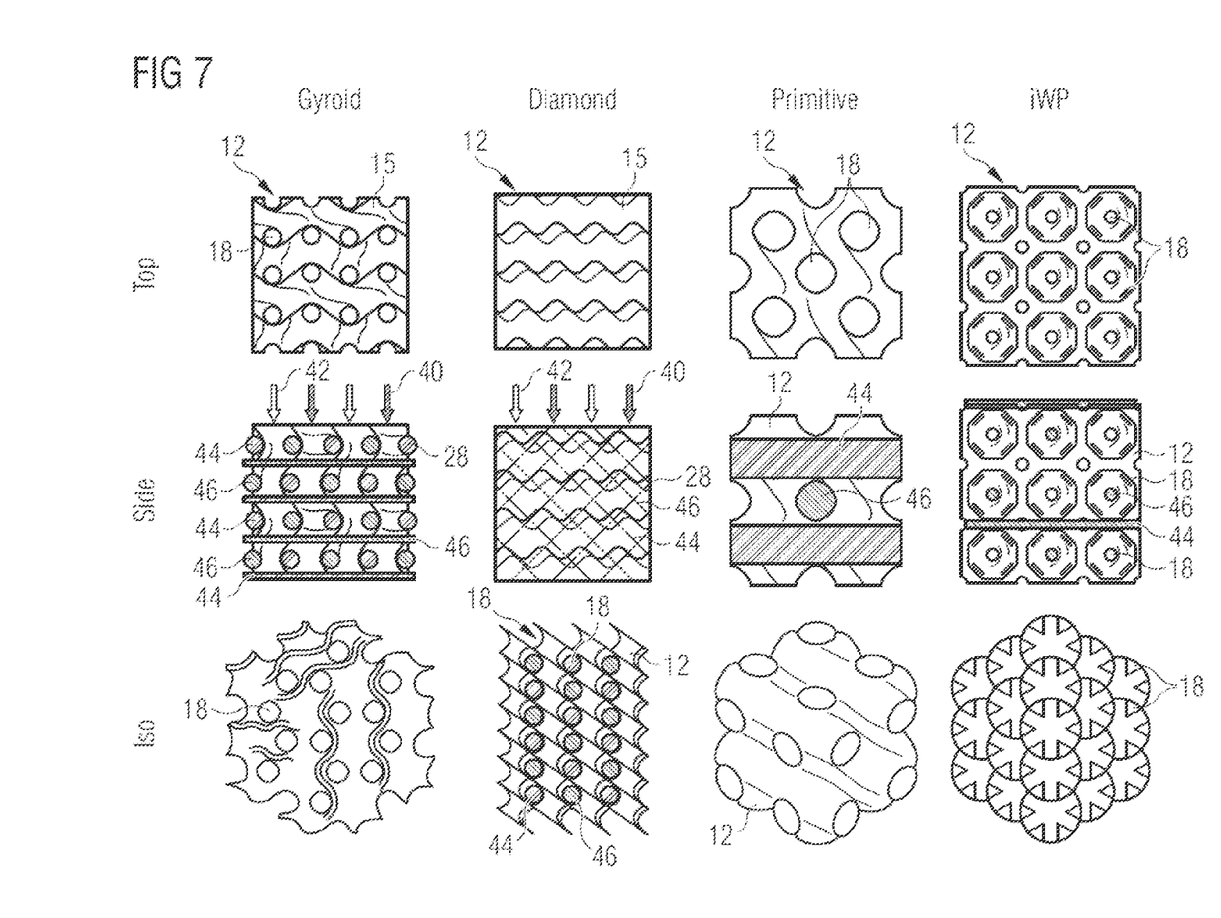
FIG. 7 views of membrane structures with different triply periodic level surface shapes.

FIG. 7 shows, as well as the gyroid 17, further triply periodic level surface shapes known as diamond, primitive and iWP. FIG. 7 also shows how the interconnector elements 28 are inserted in the gas channels 18.

Because of the intrinsic properties of the triply periodic level surface shapes, anodes 44 and cathodes 46 are preferably arranged alternately. As furthermore evident from FIG. 7, not all gas channels 18 need be equipped with an interconnector element 28.

In order to improve the usability of hybrid electric or fully electric aircraft, a fuel cell 10 is disclosed with improved efficiency and increased volume-specific or weight-specific energy density. The fuel cell 10 has a self-supporting membrane structure 12 which is configured as a triply periodic level surface which separates gas-tightly a first cavity 14 loaded with fuel 40, from a second cavity 16 loaded with oxidation agent 42, but connects the two cavities 14, 16 together ion-conductively.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Fuel cell
12 Self-supporting membrane structure
14 First open-pored cavity
15 Solid electrolyte
16 Second open-pored cavity
17 Gyroid
18 Gas channel
20 Membrane structure region
22 Electrically conductive contact layer
24 Anode layer 26 Cathode layer
28 Interconnector element
30 Linear contact
32 Interconnector body
34 Conductive strip
36 Gas passage
38 Gas distributor
40 Fuel
42 Oxidation agent
44 Anode
46 Cathode

The invention claimed is:

1. A fuel cell for a fuel cell system, the fuel cell comprising:
a first cavity that is open-pored and comprises one or more first gas channels;
a second cavity that is open-pored and comprises one or more second gas channels;
a membrane structure that is self-supporting; and
a plurality of interconnector elements that are elongate and straight, one or more interconnector elements of the plurality of interconnector elements comprising:
an interconnector body; and
a conductive strip that is wound helically around the interconnector body;
wherein the membrane structure ion-conductively connects together the first cavity and the second cavity and separates them from one another in a gas-tight manner;
wherein the first cavity and the second cavity are mutually penetrating;
wherein the one or more first gas channels is/are configured for receiving one or more first interconnector elements of the plurality of interconnector elements;
wherein the one or more first gas channels is/are configured for receiving one or more second interconnector elements of the plurality of interconnector elements;
wherein each of the one or more first interconnector elements is inserted into one of the one or more first gas channels and contacts the membrane structure; and
wherein each of the one or more second interconnector elements is inserted into one of the one or more second gas channels and contacts the membrane structure.

2. The fuel cell of claim 1, wherein the membrane structure and the one or more interconnector elements define a gas passage region configured to allow a flow of gas along an outside of the one or more interconnector elements.

3. The fuel cell of claim 1, wherein the membrane structure comprises a membrane structure region that connects together two adjacent first gas channels, two adjacent second gas channels, or one of the one or more first gas channels that is adjacent to one of the one or more second gas channels ion-conductively and separates them from one another in a gas tight manner.

4. The fuel cell of claim 1, wherein at least one of the one or more first gas channels is arranged skewed relative to at least one of the one or more second gas channels.

5. The fuel cell of claim 1, wherein the membrane structure contains a solid electrolyte.

6. The fuel cell of claim 1, comprising:
an anode layer that is electrically conductive; and
a cathode layer that is electrically conductive;
wherein the anode layer and the cathode layer are arranged on the membrane structure;
wherein the anode layer is arranged in one of the first cavity and the second cavity and the cathode layer is arranged in the other of the first cavity and the second cavity.

7. The fuel cell of claim 6, wherein the plurality of interconnector elements are configured to contact the anode layer and the cathode layer.

8. The fuel cell of claim 7, wherein at least one interconnector element of the plurality of interconnector elements is configured to:
form a helical linear contact with the membrane structure and/or the anode/cathode layer when the at least one interconnector element is inserted in one of the first cavity and the second cavity; and/or
define, with the membrane structure and/or the anode/cathode layer, a gas passage region which allows a flow of gas in a longitudinal direction and/or in a circumferential direction and/or a helical flow of gas along the at least one interconnector element when the at least one interconnector element is inserted in one of the first cavity and the second cavity.

9. The fuel cell of claim 1, comprising:
at least one gas distributor which is on an inlet side and/or an outlet side of the membrane structure;
wherein:
when the at least one gas distributor is arranged on the inlet side, the at least one gas distributor is configured such that one of the first cavity and the second cavity can be loaded with gaseous fuel and another of the first cavity and the second cavity can be loaded with gaseous oxidation agent; and/or
when the at least one gas distributor is arranged on the outlet side, the at least one gas distributor is configured such that reaction products and/or residual gas can be discharged from a respective one of the first cavity and the second cavity.

10. The fuel cell of claim 1, wherein the membrane structure is in a form of a triply periodic level surface.

11. The fuel cell of claim 10, wherein a shape of the triply periodic level surface is selected from a group of surface shapes consisting of a gyroid shape, a gyroid-like shape, a diamond shape, a diamond-like shape, an iWP shape, an iWP-like shape, a solid P-shape, a solid P-like shape, and also surface shapes which deviate from such shapes by less than 10%.

12. The fuel cell of claim 1, where the fuel cell is a solid oxide fuel cell of an aircraft.

13. A fuel cell system for an aircraft comprising a plurality of fuel cells of claim 1, which are electrically connected together in series, in parallel, or in series and parallel.

14. An aircraft comprising a fuel cell of claim 1.

15. An aircraft comprising a fuel cell system of claim 13.

16. A method of using a triply periodic level surface shape as a membrane structure of a fuel cell, the fuel cell comprising:
a first cavity that is open-pored and comprises one or more first gas channels;
a second cavity that is open-pored and comprises one or more second gas channels;
a membrane structure that is self-supporting;
a plurality of interconnector elements that are elongate and straight, one or more interconnector elements of the plurality of interconnector elements comprising:
an interconnector body; and
a conductive strip that is wound helically around the interconnector body;
wherein the membrane structure ion-conductively connects together the first cavity and the second cavity and separates them from one another in a gas-tight manner;
wherein the first cavity and the second cavity are mutually penetrating;

wherein the one or more first gas channels is/are configured for receiving one or more first interconnector elements of the plurality of interconnector elements;

wherein the one or more first gas channels is/are configured for receiving one or more second interconnector elements of the plurality of interconnector elements;

wherein each of the one or more first interconnector elements is inserted into one of the one or more first gas channels and contacts the membrane structure; and wherein each of the one or more second interconnector elements is inserted into one of the one or more second gas channels and contacts the membrane structure;

the method comprising:

loading the first cavity with a fuel; and loading the second cavity with an oxidation agent.

17. The method of claim 16, wherein the membrane structure and the one or more interconnector elements define a gas passage region configured to allow a flow of gas along an outside of the one or more interconnector elements.

18. The method of claim 17, comprising at least one gas distributor which is on an inlet side and/or an outlet side of the membrane structure, wherein the interconnector body of each of the one or more interconnector elements is in a form of a bar with circular cross-section.

* * * * *

UNITED STATES PATENT AND TRADEMARK OFFICE
CERTIFICATE OF CORRECTION

PATENT NO. : 11,876,265 B2
APPLICATION NO. : 17/462297
DATED : January 16, 2024
INVENTOR(S) : Kristian Zimmermann, Stephan Friedl and Christian Metzner Page 1 of 1

It is certified that error appears in the above-identified patent and that said Letters Patent is hereby corrected as shown below:

In the Claims

Column 7, Line 34: "one or more first gas channels" should be -- one or more second gas channels --.

Column 9, Line 4: "one or more first gas channels" should be -- one or more second gas channels --.

Signed and Sealed this
Twenty-seventh Day of May, 2025

Coke Morgan Stewart
*Acting Director of the United States Patent and Trademark Office*